United States Patent [19]
Gulistan

[11] Patent Number: 6,077,014
[45] Date of Patent: Jun. 20, 2000

[54] RELIABLE BOLT AND CLIP RESTRAINER ASSEMBLY

[76] Inventor: Bulent Gulistan, 20568 Pinnacle Way, Malibu, Calif. 90265

[21] Appl. No.: 09/451,398

[22] Filed: Nov. 30, 1999

[51] Int. Cl.[7] .............................. F16B 23/00; F16B 35/06
[52] U.S. Cl. ......................... 411/396; 411/169; 411/400; 470/13
[58] Field of Search ................................... 411/166, 396, 411/169, 400, 401; 470/11, 13

[56] References Cited

U.S. PATENT DOCUMENTS

| | | | |
|---|---|---|---|
| 362,274 | 5/1887 | Hall | 411/400 |
| 2,246,457 | 6/1941 | Schultz | 411/400 X |
| 3,362,449 | 1/1968 | Barwick et al. | 411/396 X |
| 4,974,274 | 12/1990 | Compton et al. | 411/400 X |

*Primary Examiner*—Neill Wilson
*Attorney, Agent, or Firm*—Oppenheimer Wolff & Donnelly LLP

[57] ABSTRACT

A bolt and restraining clip assembly are formed by providing a raised square portion on the head of the bolt on the side of the head away from the threaded end of the bolt. A clip with a mating square hole is mounted on the raised square portion, and an additional central protrusion extending outwardly from the raised square portion is impacted, for example in a punch press, to form a boss extending outwardly over the hole in the clip to firmly secure the clip to the bolt.

18 Claims, 2 Drawing Sheets

RELIABLE BOLT AND CLIP RESTRAINER ASSEMBLY

FIELD OF THE INVENTION

This invention relates to bolts with clips to avoid rotation of the bolts, and wherein the bolt and clip assembly does not readily come apart.

BACKGROUND OF THE INVENTION

Known prior art engine clip bolts are disclosed in U.S. Pat. No. 4,974,274 granted Dec. 4, 1990, and entitled "Method of Making an Engine Clip Bolt"; in U.S. Pat. No. 5,092,723 granted Mar. 3, 1992, and entitled "Engine Clip Bolt"; and in U.S. Pat. No. 3,451,456 granted Jun. 24, 1969, and entitled "Bolt with Restrainer."

The '456 patent discloses a bolt with a rotation restraining clip secured to the head of the bolt either by (1) three rivets which are integral with the head of the bolt and which extend through three mating holes in the clip, or by (2) a bolt with a square rivet shank extending through a square opening in the clip, with the corners of the rivet shank riveted over the clip.

The disclosures of the '274 and the '723 patents are substantially the same, and involve the provision of a clip with a scalloped opening and a bolt with a cylindrical protrusion on its head which initially extends through the scalloped hole in the clip and which is orbitally swaged outward into the scalloped recesses and over the entire opening of the clip. This configuration is intended to hold the clip in place onto the bolt, even if the clip rotates relative to the bolt, to avoid possible damage to associated equipment that could be caused by a loose clip. The patent files associated with the '274 and '723 patents define the term "scalloped" as "having a wavy edge, border or design," and a "scallop" as "one of a series of rounded projections . . . "

The '274 and '723 patents use an orbital swaging machine to swage the cylindrical protrusion into the scalloped recesses. This is a relatively expensive and time-consuming process, as an orbital swaging machine may cost about $30,000, and the orbital swaging process requires the substantial interval of time needed to advance the swaging tool as it is being rotated.

SUMMARY OF THE INVENTION

Accordingly, one object of the invention is to form a reliable bolt and clip restrainer assembly by a quicker and less expensive process than the orbital swaging process discussed above.

In accordance with a specific embodiment of the present invention, a bolt and clip restraining assembly provides a bolt head with a square raised portion on the side of the head away from the threaded end of the bolt, and with a protruding portion extending outwardly from the center of the square raised portion. A restrainer clip is provided with a mating square opening, and is secured in place by deformation of the outwardly protruding portion of the bolt so that the deformed metal forms a boss extending over the surface of the clip entirely around the opening in the clip, thereby firmly securing the restraining clip to the bolt.

An important advantage of the new design is that the final metal forming step may be accomplished in a single rapid upsetting step by a punch press or the like, thus avoiding the expensive and time-consuming orbital swaging operation employed in the '274 and '723 patents cited hereinabove.

From a broader standpoint, instead of the square raised portion, the raised portion could have the shape of another regular polygon such as a triangle, for example, with a matching opening in the restrainer clip.

Other objects, features and advantages of the invention will become apparent from a consideration of the following detailed description and from the accompanying drawings.

DETAILED DESCRIPTION OF PREFERRED EMBODIMENT

Figure 1:
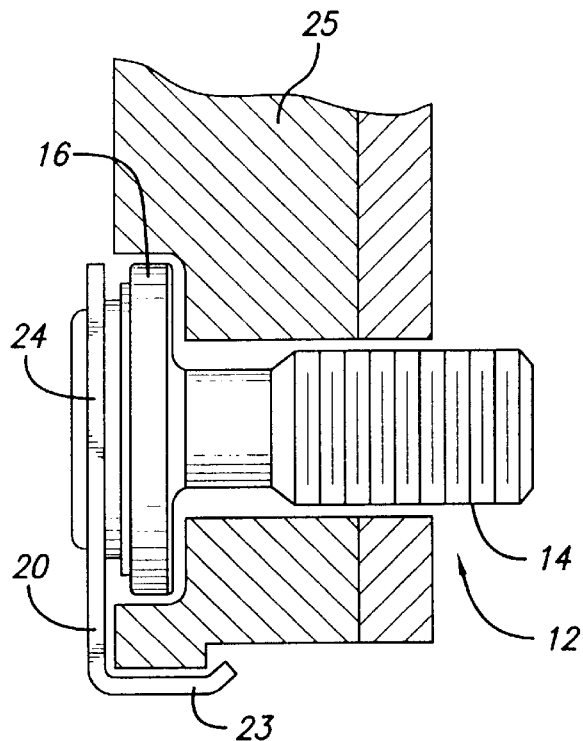
FIG. 1 is a partial cross-sectional view showing a prior art bolt and restrainer clip assembly.
Figure 2:
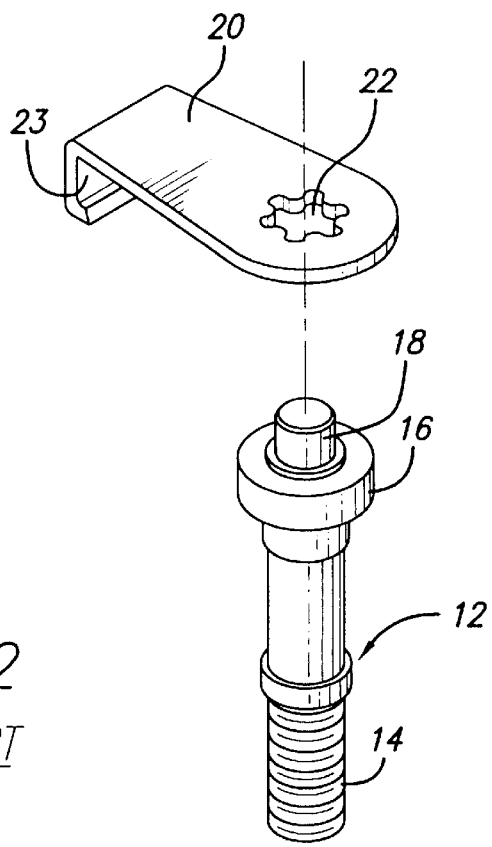
FIG. 2 is an exploded view of the assembly of FIG. 1 showing the scalloped opening in the clip and an extension from the bolt head prior to the orbital swaging step.

Referring now to the drawings, FIG. 1 is a partial cross-sectional view, and FIG. 2 is an exploded view of the prior art device disclosed in U.S. Pat. No. 5,092,723, discussed hereinabove.

With regard to the prior art showing of FIGS. 1 and 2, a bolt 12 is provided with a threaded end 14 and a head 16. The bolt 12 is normally formed from wire or rod stock, and the head 16 is formed in a heading machine, or header. These machines operate at high speeds and are very noisy as they hold the shank of the bolt and impact the end of the wire or rod stock with a die which expands the end of the wire or rod stock to form the head 16 and which also forms the cylindrical protrusion 18 which extends outwardly from the head 16.

The clip 20 is provided with an opening 22 having a scalloped periphery. The clip 20 is mounted onto the protrusion 18 on the bolt. The protrusion 18 is then subject to an orbital swaging operation by which the protrusion 18 is expanded into the scalloped recesses of the hole 22 of the clip 20, and forms the retaining boss 24 which overlies the upper surface of the clip 20. The clip 20 has a bent portion 23 which engages a fixed member 25 to prevent rotation of the clip and bolt.

Figure 3:
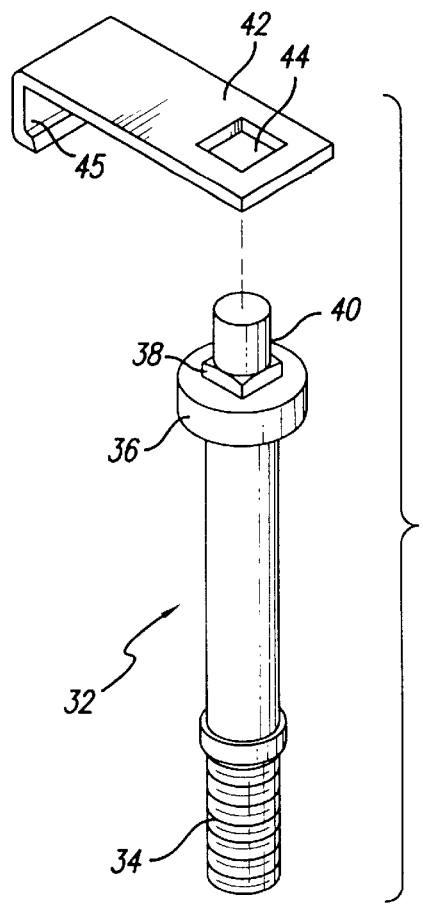
FIG. 3 is an exploded perspective view of a bolt and clip restrainer prior to securing the restrainer clip in position, illustrating the principles of the invention.
Figure 4:
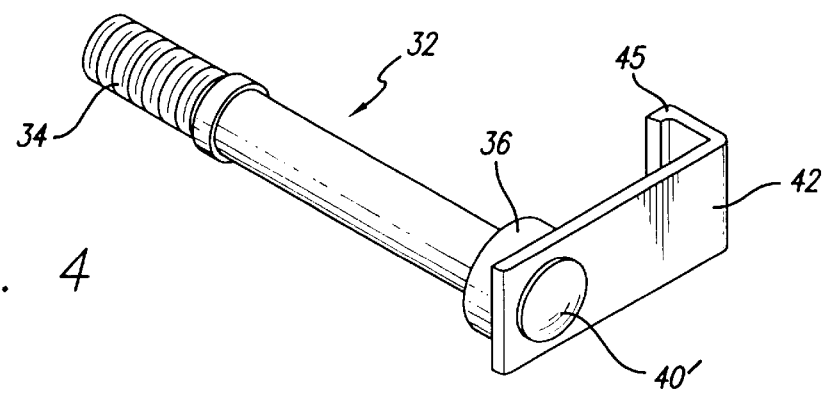
FIG. 4 is a perspective view showing the bolt and restraining clip following the upsetting of a boss which holds the clip in place.
Figure 5:
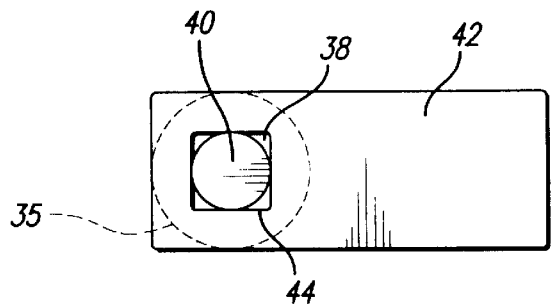
FIG. 5 is a top view of the bolt and clip assembly of FIG. 3 following assembly of the clip to the bolt but prior to upsetting the boss to hold the clip in place.

Now, referring to FIGS. 3–5 of the drawings, they illustrate a preferred embodiment of the present invention. Specifically, the bolt 32 has a threaded end 34 and a head 36 which has been upset in a header. In addition, as best shown in FIG. 3, the impacting die of the header is configured to form the square low-lying raised portion or protrusion 38 and the central outwardly extending cylindrical protrusion 40.

The restraining clip 42 has a mating square opening 44 which makes a close fit as it is assembled onto the square protrusion 38 on the outer surface of the head 36. Following assembly of the clip and bolt, the cylindrical protrusion 40 is impacted, for example in a punch press, to form the boss 40' which extends completely over and extends beyond the edges of the opening 44. By using the mating square protrusion 38 and mating square hole 44, with the central protruding material 40, the boss 40' may be formed with a simple impacting step in a punch press or similar machine tool, instead of in a more expensive and time consuming orbital savaging apparatus, employed in forming the assembly of FIGS. 1 and 2. The clip 42 has a bent portion 45 for engagement with a fixed member to prevent rotation of the clip and bolt.

FIG. 5 is a top view of the bolt with the clip 42 having its square hole 44 assembled to the square protrusion 38 of the bolt, but prior to the formation of the boss 40' from the cylindrical protrusion 40.

Concerning materials, the bolts and clip may be formed of steel, titanium, or any of the many alloys or other materials which may be employed in making fasteners. Concerning the strength of the fasteners, with ¼-inch diameter bolts, and 1/16-inch thick stock for the clip, certain specifications require that the retaining clip will not yield under an angular torque of 220 inch pounds, and that the clip will bend or deform before it comes free from the bolt. The fastener as disclosed herein had mechanical properties substantially exceeding these requirements. It is further noted that, in order to increase the resistance to separation of the clip and the bolt, the protrusion 40 may be increased in size so that the resultant boss 40' will have greater strength to resist separation.

The foregoing detailed description and accompanying drawings relate to one preferred illustrative embodiment of the invention. Various alternative constructions and methods may be employed without departing from the spirit and scope of the invention. Thus, by way of example and not of limitation, bolts of somewhat different configuration from that shown in the drawings may be employed. The mating hole and raised protrusion may have other polygonal mating shapes, such as a triangular configuration. Further, the final impacting step may be accomplished by a punch press, by a header, or by manual impacting means with controlling fixtures or dies. Accordingly, the present invention is not limited to the precise embodiments or methods as described in detail hereinabove.

What is claimed is:

1. A bolt and restraining clip assembly comprising:
   a bolt threaded at one end and having a head at the other end;
   a square protrusion extending outwardly from said head in the direction away from the threaded end of the bolt, and additional impact-formed metallic material extending outward from said square protrusion;
   a restraining clip having a square opening mating with and having a close fit with said square protrusion;
   said additional formed material extending over said opening in said restraining clip entirely around said opening and forming a boss on said bolt holding said clip in place; and
   said restraining clip being formed of sheet metal stock of a predetermined substantially uniform thickness, and said clip having an outer end, spaced away from the opening therein, which is bent to hold the clip and bolt against rotation.

2. An assembly as defined in claim 1 wherein the bolt and clip are made of steel.

3. An assembly as defined in claim 1 wherein said boss is of sufficient size and extent that said clip will bend prior to separation of said clip from said bolt.

4. A bolt and restraining clip assembly comprising:
   a bolt threaded at one end and having a head at the other end;
   a polygonal protrusion extending outwardly from said head in the direction away from the threaded end of the bolt, and additional formed material extending outward from said protrusion;
   a restraining clip having an opening of substantially the same shape as said protrusion mating with said polygonal protrusion;
   said additional formed material extending over said opening in said restraining clip entirely around said opening and forming a boss on said bolt holding said clip in place; and
   said restraining clip being formed of sheet metal stock of a predetermined substantially uniform thickness, and said clip having an outer end, spaced away from the opening therein, which is bent to hold the clip and bolt against rotation.

5. An assembly as defined in claim 4 wherein the bolt and clip are made of steel.

6. An assembly as defined in claim 4 wherein said boss is of sufficient size and extent that said clip will bend prior to separation of said clip from said bolt.

7. A bolt and restraining clip assembly as defined in claim 4 wherein said protrusion is rectangular.

8. A bolt and restraining clip assembly comprising:
   a bolt threaded at one end and having a head at the other end;
   a square protrusion extending outwardly from said head in the direction away from the threaded end of the bolt, and additional impact-formed metallic material extending outward from said square protrusion;
   a restraining clip having a square opening mating with and having a close fit with said square protrusion;
   said additional formed material extending over said opening in said restraining clip entirely around said opening and forming a boss on said bolt holding said clip in place; and
   said restraining clip is being bent at a point displaced from said bolt to engage a fixed member to prevent said clip from rotating with said bolt.

9. A bolt and restraining clip assembly comprising:
   a bolt threaded at one end and having a head at the other end;
   a polygonal protrusion extending outwardly from said head in the direction away from the threaded end of the bolt, and additional formed material extending outward from said protrusion;
   a restraining clip having an opening of substantially the same shape as said protrusion mating with said polygonal protrusion;
   said additional formed material extending over said opening in said restraining clip entirely around said opening and forming a boss on said bolt holding said clip in place; and
   said restraining clip is being bent at a point spaced from said bolt to engage a fixed member to prevent said clip from rotating with said bolt.

10. A method for making a bolt and restraining clip assembly comprising:
    forming (a) a bolt threaded at one end and having a head at the other end; (b) a polygonal protrusion extending outwardly from said head in the direction away from the threaded end of the bolt, and additional formed material extending outward from said protrusion; (c) a restraining clip having an opening of substantially the same shape as said protrusion mating with said polygonal protrusion; and (d) said additional formed material extending over said opening in said restraining clip entirely around said opening and forming a boss on said bolt holding said clip in place;

said method including the steps of forming said head in a header;

assembling said clip and said bolt; and impacting the additional material to form said boss.

11. A method as defined in claim 10 wherein said forming step includes forming said polygonal protrusion in the configuration of a square.

12. A method as defined in claim 10 wherein said forming step includes forming said polygonal protrusion in the configuration of a triangle.

13. A method as defined in claim 10 wherein said forming step includes forming said bolt and clip of steel.

14. A method as defined in claim 10 wherein said forming step includes bending said clip to facilitate engaging a fixed member to avoid rotation of said assembly.

15. A method as defined in claim 10 wherein said impacting step includes the use of a punch press.

16. A method as defined in claim 10 wherein said forming step includes forming said additional formed material to have a length at least equal to the thickness of said head.

17. A method as defined in claim 10 wherein said forming step includes forming said bolt and said clip of metal.

18. A method as defined in claim 10 wherein said forming step includes forming said polygonal protrusion in the configuration of a rectangle.

* * * * *